United States Patent [19]
Carr

[11] 4,340,286
[45] Jul. 20, 1982

[54] PHOTOGRAPHIC FILM UNIT

[75] Inventor: David L. Carr, Fairport, N.Y.

[73] Assignee: Eastman Kodak Company, Rochester, N.Y.

[21] Appl. No.: 237,172

[22] Filed: Feb. 23, 1981

Related U.S. Application Data

[63] Continuation of Ser. No. 931,060, Aug. 4, 1978, abandoned.

[51] Int. Cl.³ .............................................. G03B 21/50
[52] U.S. Cl. ..................................... 354/105; 352/37; 353/120; 360/2; 360/135
[58] Field of Search .......................... 353/120, 19, 110; 360/135, 2; 354/105; 352/37

[56] References Cited

U.S. PATENT DOCUMENTS

| | | | |
|---|---|---|---|
| 3,490,844 | 1/1970 | Sapp | 354/105 |
| 3,572,993 | 3/1971 | Rogers | 360/131 |
| 3,644,032 | 2/1972 | Dimitracopoulos | 353/120 |
| 3,712,723 | 1/1973 | Gerry | 353/19 |
| 4,043,651 | 8/1977 | Livingston | 353/19 |

Primary Examiner—Steven L. Stephan
Attorney, Agent, or Firm—D. M. Woods

[57] ABSTRACT

A film unit comprises a hub and a film disk carried by the hub having photosensitive areas for receiving a plurality of images. The hub includes a region of dispersed magnetic particulates for recording data pertaining to the film unit. Since the hub supports the film disk, the data will remain oriented relative to the disk, and to specific images on the disk, during processing steps incident to the finishing of the film unit, e.g. during developing and printing.

7 Claims, 3 Drawing Figures

PHOTOGRAPHIC FILM UNIT

This is a continuation of application Ser. No. 931,060, filed Aug. 4, 1978 now abandoned.

BACKGROUND OF THE INVENTION

1. Field of the Invention

The invention generally relates to photographic film units having photographic and magnetic recording media combined in one unit. More specifically, the invention relates to photographic film units adapted to receive a plurality of photographic images and data pertaining to the images on an associated magnetic element.

2. Description Relative to the Prior Art

A film unit in accordance with the invention has particular utility when used to associate data relating to specific images throughout all, or a portion of, conventional photographic manufacturing, exposure, and processing steps. The disadvantages and limitations of certain prior uses of magnetic recording media with photographic film are generally discussed in U.S. Patent Application Ser. No. 253,482 filed Apr. 13, 1981 as a continuation of Ser. No. 931,061, (now abandoned) in the name of W. L. Ballard, filed concurrently with and assigned to the same assignee as the present invention. More specifically, a film unit is disclosed in such application having a disk shaped film element with a photosensitive area for recording images and a hub supporting the film element. The hub includes a magnetic region for recording information relating to the images, for example, data useful in photofinishing. In a specific embodiment of the invention disclosed and claimed in such copending application, a magnetic region is provided by force fitting or otherwise attaching a detachable magnetic ring over the outer perimeter of the hub to rest upon the hub and the inwardly extending surface of the film disk. The present invention represents an improvement over such a structure.

SUMMARY OF THE INVENTION

In accordance with the invention, a magnetic media is provided on a film unit without using image areas but in a manner such that recorded data is indexed to recorded images during manufacture and finishing. In the disclosed embodiment, a photographic film unit comprises a disk shaped film element having a photosensitive area for recording images and a hub supporting the film element. The hub is fabricated from material containing dispersed magnetic particulates, e.g., magnetic oxide, for recording information relating to the images, for example, data useful in photofinishing.

BRIEF DESCRIPTION OF THE DRAWINGS

A preferred embodiment of the invention will be described with reference to the drawings, wherein.

DETAILED DESCRIPTION OF THE INVENTION

The present description will be directed in particular to elements forming part of, or cooperating more directly with, a preferred embodiment of the present invention. Elements not specifically shown or described may take various forms well known to those skilled in the art. In particular, any photographic component, (i.e., photosensitive layers, film support, etc,) is understood to be selected from any of numerous well known components.

Figure 1A:
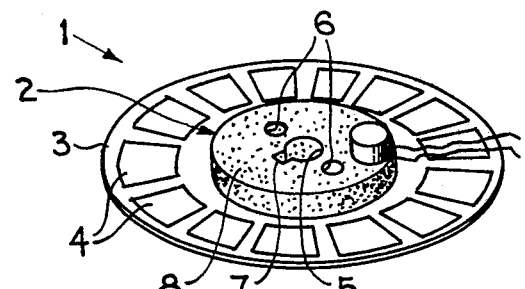
FIGS. 1A and 1B illustrate a presently preferred embodiment of the invention.

Referring initially to FIG. 1, a film unit 1 includes a core or hub 2 and a film disk 3 supported by the core or hub 2. Since the hub 2 is a structural support for the film disk 3, it is formed of a substantially rigid material, for example, polystyrene or other suitable plastic materials. The film disk includes an annular photosensitive image area outwardly from the perimeter of the hub 2 for receiving a plurality of separate images 4. The hub 2 includes a spindle aperture 5 and a pair of positioning holes 6 spaced outwardly from the spindle aperture 5 on opposite sides thereof. A spindle keyway 7 is formed on one side of the aperture 5. The spindle aperture 5 and the positioning holes 6 together cooperate with rotary apparatus (later described) for moving the film unit 1. The keyway 7 assists in assuring one-way positioning of the film unit 1 on the apparatus.

In the presently preferred embodiment, the hub 2 is provided with a magnetic region formed by dispersing magnetic particulates 8 in the plastic core 2. The magnetic particulate may be various particulate, ferromagnetic or ferrimagnetic materials, such as gamma ferric oxides (doped or not doped), ferrousferric oxides, chromium dioxide, ferricferrites, etc. A conventional iron oxide is exemplary of the type of magnetic particulate that may be used in the practice of this invention. Brown iron oxide ($\delta Fe_2O_3$) has been found adequate in providing the light lock protection needed in photographic applications. In cases where black materials are essential, a cubic black iron oxide ($Fe_3O_4$) may be used.

Preferably, the particulate is dispersed in the plastic material used to manufacture the hub 2. The dispersion may be accomplished in numerous concentrations by conventional processes. For example, a dispersion of conventional iron oxide powder in a conventional rubber-modified impact grade polystyrene binder was prepared in suitable mixing apparatus according to the following proportions by weight:

| Material | Parts by Weight |
| --- | --- |
| iron oxide | 5 |
| polystyrene | 95 |

The proportion by weight is exemplary of a suitable dispersion; other dispersions were prepared including oxide-to-binder ratios by weight ranging from 1:1 to 1:100. The mixing apparatus may be selected from various conventional apparatus, for example, a batch-type mixer or a compounding (twin-screw) extruder. Whatever the apparatus, the resultant oxide-impregnated binder is conventionally pelletized. The pelletized magnetic oxide-polystyrene mixture is subsequently fed to conventional injection molding apparatus for producing the hub structure 2. With the iron oxide particles 8 dispersed in the core material, the hub 2 becomes a recording medium on which various data can be magnetically recorded and indefinitely stored (or selectively erased).

Figure 1B:
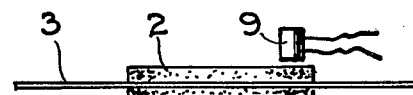

As shown in FIG. 1B, a magnetic head 9 may be positioned adjacent or in contact with the hub 2 to record and/or reproduce data during rotation of the hub relative to the head. It will be apparent from FIG.

1B that iron oxide particles throughout the hub 2 may be unnecessary, and iron oxide only in the regions or areas adjacent the path of the magnetic head 9 will be sufficient. Similarly, depending upon the concentration of the iron oxide particles, it may be satisfactory to spread iron oxide only in a surface layer of the hub 2.

The encoding characteristics of the oxide-impregnated hub have been observed to depend upon the thickness of the hub. The signal to noise ratio of the recording increases as the recorded wavelength approaches the thickness of the hub. It is believed that larger wavelengths involve a greater thickness—and therefore utilize a greater volume of oxide—than shorter wavelengths. In terms of encoding capability, a bit packing density of 100 bits/inch was empirically observed at a signal-to-noise ratio of 28.2 dB with conventional measuring equipment. For these tests, the material included a 5% concentration by weight of iron oxide particles in a hub of 40 mil thickness. A signal was employed of 8 mil wavelength to record an arcuate track on the hub. The recording frequency is related to the rotational velocity of the hub during recording.

Since the magnetic recording and photographic media are combined in one unit, it is feasible for magnetically recorded data to accompany corresponding photographic information throughout various photographic operations. In U.S. Patent Application Ser. No. 253,482, there are illustrated the steps of a typical photographic process from manufacture of the film unit to the print in the customer's hand. Importantly, data pertaining to the film product can be carried throughout the process on the film unit. As described in Application Ser. No. 253,482, information can be recorded on the magnetically impregnated hub 2 at various steps in the photographic process.

For example, at the manufacturing stage, certain film information can be recorded on the hub 2. Such information may include, but is not limited to, ASA film speed, film type (indoor/outdoor), color or black/white, film expiration dating, exposure latitude, emulsion number, process code, etc. The manufacturer may also record a unique identification number on the film unit. This information may be used for control by the photofinisher, as well as the manufacturer, e.g., for sorting and verifying that similar film types or emulsions are handled in a similar manner.

The manufactured product is sold in due course, and the customer-user places the film unit 1 in a camera and exposes each frame. Magnetic recording/reproducing capability at this stage potentially serves two functions. First, film related information—such as ASA film speed, film type, film latitude, etc,—can be retrieved and provided to the camera exposure control system for use in adjusting or operating the aperture, shutter, and flash lighting devices of the camera. Secondly, pertinent exposure information may be recorded that will be helpful at later stages of the utilization process, such as the character and type of lighting employed.

The film unit 1 is then removed from the camera and delivered to the photofinisher by customary means-either by mail or through a dealer. If through a dealer, the dealer could record his unique identifying number upon the hub 2, thereby assisting in order control at the photofinishing plant. At the plant, the film unit 1 proceeds through a receiving station, where the film is sorted for size and type. Certain information pertaining to the customer, such as customer order number, number of prints desired, print sizes, etc, are possible entries upon the magnetic hub 2. The film unit is then developed to form visible images and sent to the printer.

Printing generally proceeds automatically in that the negative is either prescanned for appropriate exposure correction or the printing light is measured during printing to control an arrangement of cutoff filters. Nonetheless, it has been found helpful if the printer is adjusted to take into account certain information. For example, the number of prints is useful information on reprint orders. Therefore, the printer includes a reading head for interrogating data on the hub 2, and retrieving the information recorded, for example, at the receiving station. The printer control system is appropriately modified in accordance with the retrieved information. If the print size is additionally recorded on the hub 2, a printer having capability for making more than one print size may be automatically controlled. With the image frame remaining in the printing gate, the print size is automatically read from the hub 2 and the printer is accordingly controlled to make the desired prints. On the other hand, with multiple different-sized printers, the print size data recorded on the hub 2 may be used to conveniently route the film unit between different printers.

Figure 2:
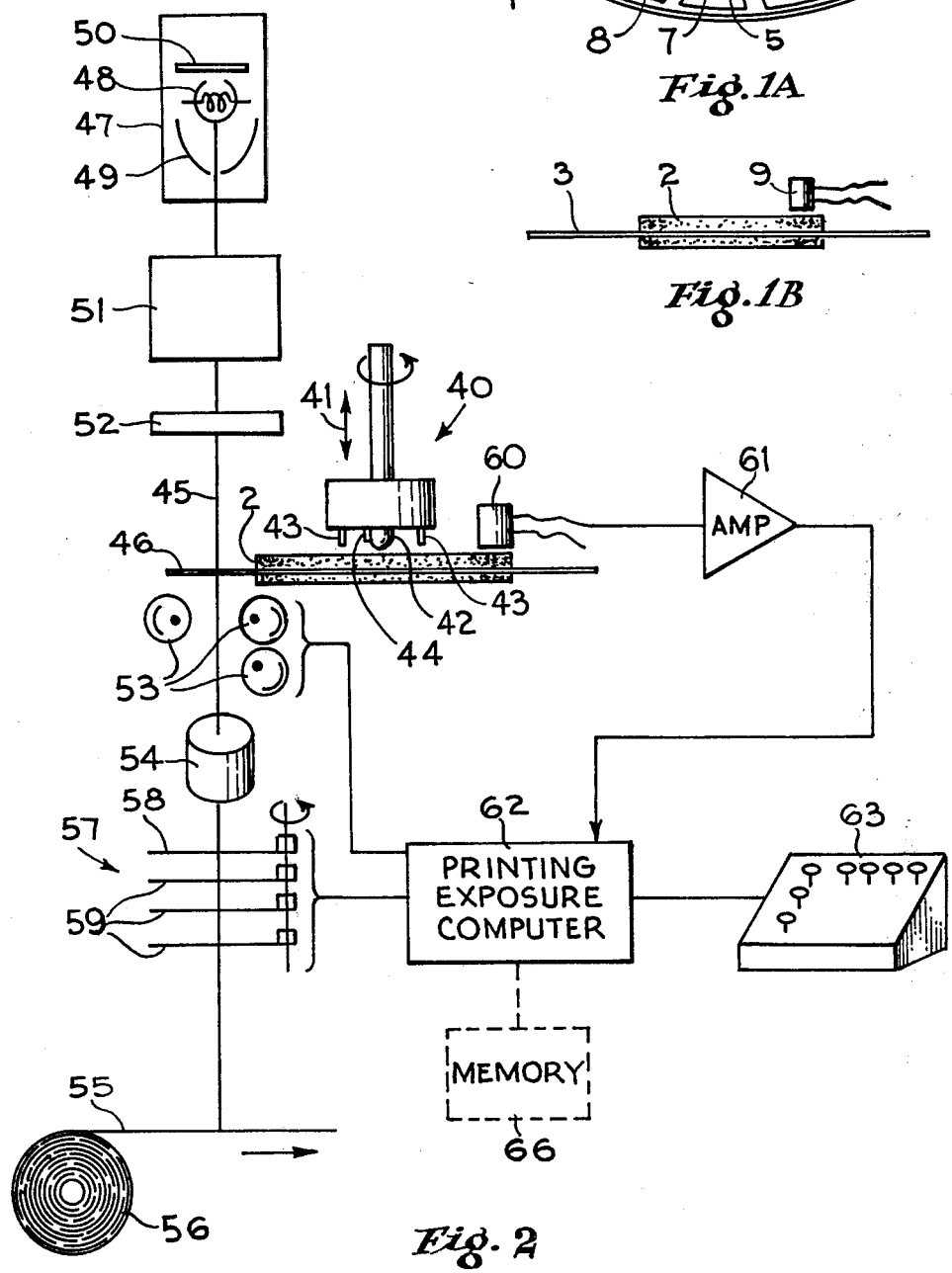
FIG. 2 is a schematic diagram of a film unit in accordance with the invention showing its use with a photographic printer.

Information recorded on the hub 2 is disposed for use by a photographic printer schematically illustrated in FIG. 2. A rotor assembly 40 is mounted for axial displacement as indicated by an arrow 41 so as to drop down and seat upon the hub 2 of the film unit 1. A spindle 42, and positioning pins 43, extend from the assembly 40 to engage with the spindle aperture 5 and positioning holes 6, respectively, of the hub 2. A key 44 on the spindle 42 mates with the keyway 7 and thereby provides one-way positioning. The film unit is so positioned that particular frames 4 line up successively along the optical axis 45 and in the printing gate aperture 46 of the printer. Printing light is generated within an illumination assembly 47 which includes a lamp 48 and an ellipsoidal reflector 49. A "cold" mirror 50 transmits heat radiation out the back of the illumination assembly 47 and reflects useful white light out an aperture in the front of the ellipsoidal reflector 49.

A light integrator 51 concentrates and scrambles the light for the particular size negative being used. The printing light is further modified by a diffuser 52 to reduce the effect of scratches on the image frames 4. The printing light then traverses the image frame, where it is modified according to scene content. Red, green, and blue phototubes 53 measure the red, green, and blue content of the image light so modified by the image frame 4. A printing lens 54 gathers the light and focuses the light toward an image plane on the surface of the photographic paper 55. The paper 55 is mounted for incremental movement from a supply roll 56 in accordance with sequential exposures to image light from successive image frames 4.

Interposed between the lens 54 and the paper 55 is a shutter filter assembly 57 for controlling the light. A dark shutter 58 is adapted for movement out of the path of the printing light to start the image exposure. Cyan, magenta, and yellow filters 59 enter the light beam according to measurements derived from the phototubes 53 to control, respectively, the red, green, and blue exposures for the image frame 4. The dark shutter 58 is further adapted to enter the printing beam to terminate the exposure.

A magnetic head 60 is positioned adjacent the hub 2 for reproducing information recorded on the hub. The head 60 is connected to an amplifier 61, which in turn is connected to a printing exposure computer 62. A classification keyboard 63 is also connected to the computer 62. The computer 62 is further connected to the phototubes 53 and the shutter/filter assembly 57.

The operation of the information recording feature on the film element 1 will now be described in connection with use of the information during printing. Information may be recorded at numerous steps illustrated in copending Application Ser. No. 253,482. If the information to be recorded is in the form of a single bit, i.e., the simple existence or non-existence of a condition, the head 9 (FIG. 1B) may be energized and the magnetic particulates in the hub 2 will be accordingly magnetized. Relative movement between the hub 2 and the head 9 is unnecessary. However, if a series of bits are to be recorded, representative of more complex data, then it is advantageous to move the hub 2 with respect to the head 9, or vice versa. In most record/playback situations, there is an ancillary need to move the hub anyhow, e.g., for purposes of image exposure and printing.

Information may be entered in areas on the hub 2 by the photofinisher. Particularly in the case of reprint orders, the number of prints can be entered on the magnetic oxide region of the hub 2. A rotor assembly, such as assembly 40 described in connection with the printer, is suitable for moving the hub 2 past a magnetic head for recording quantity opposite each image frame.

When the film unit 1, now with a print quantity indication, is printed with apparatus such as illustrated in FIG. 2, it is first placed so that the film disk 3 is adjacent the printing gate aperture 46. The printer rotor assembly 40 seats upon the hub 2 and precisely positions the film unit 1 through cooperation between the spindle 42 and the positioning pins 43, and the spindle aperture 5 and the positioning holes 6, respectively. The pick-up head 60 is positioned adjacent the hub 2 so as to sense magnetization of the iron oxide particles 8 corresponding to each image frame.

As the rotor assembly 40 rotates the hub 20 to position another frame in the printing gate aperture 46, the head 60 senses the presence of magnetization in the magnetic particulate 8. The signal resulting from such sensing is amplified by the amplifier 61 and transmitted to the computer 62. Meanwhile, the operator has visually examined the frame and has entered color and/or density correction by means of the classification keyboard 63. The dark shutter 58 opens, permitting exposure to begin. Now the red, green, and blue phototubes 53 begin to monitor the image light. As this occurs, the computer 62 senses the quantity indication from the amplifier 61 and classification entries from the keyboard 63. Each phototube 53 then integrates the scene light to a value determined by the computer 62 in view of operator classification. The number of prints is determined by the quantity data read from the hub 2.

Where the photofinisher is the initial user of the magnetic media on the film unit, a fixed association between the image frames on the film unit and specific areas on the magnetic media may be unnecessary. The magnetic region on the hub 2 may be used as a recording element conveniently anchored to the film disk 3 as a whole, rather than to the image frames 4 specifically. Customer information—such as order number, special instructions, etc,—can be serially recorded on the hub 2 without reference to specific frames. Especially in the case of reprints, where a customer has returned a film unit for additional prints, the photofinisher may enter, for each negative, the negative number and the quantity of prints from that negative. The association to an image is thereby maintained in the data recorded on the hub 2 rather than by physical association between the position of the data and a given image area.

In the case of data not related by position to the images, it is desirable to prescan the hub 2 for pertinent data before printing the first frame. Referring to FIG. 2, this may be accomplished if the rotor assembly 40 first spins the film unit 1 one revolution so that the head 60 can pick off all order related data. Such data will need to be stored in an electronic memory for later recall by the printing computer 62 (such as memory 66 shown in phantom in FIG. 2).

The invention has been described in detail with particular reference to preferred embodiments thereof, but it will be understood that variations and modifications can be effected within the spirit and scope of the invention.

What is claimed is:

1. A photographic film unit adapted for use in photographic apparatus, comprising:
   a planar photosensitive film disk having an unexposed area for receiving images;
   a molded hub attached to said film disk for rigidly supporting and rotatably positioning said film disk in photographic apparatus; and
   magnetic means uniformly dispersed within said molded hub for magnetically recording information on said hub relating to the images.

2. A photographic film unit adapted for photofinishing in photofinishing apparatus, comprising:
   a planar photosensitive film disk having an unexposed area for receiving images; and
   a core adapted to be rotatably driven by the photofinishing apparatus during photofinishing, said core rigidly supporting said film disk and having a magnetic particulate impregnated uniformly throughout a substantial portion thereof for recording information relating to the photofinishing of the images.

3. A photographic film unit adapted for photofinishing in photofinishing apparatus, comprising:
   an unexposed, photosensitive film disk for recording a plurality of images;
   a rotatable hub for rigidly supporting and rotatably positioning said film disk during photofinishing; and
   magnetic means comprising a magnetic particulate dispersed throughout said hub for recording image-related data that is used during photofinishing.

4. A photographic film unit for recording a plurality of images that are developed and printed in photofinishing apparatus, said unit comprising:
   a core of molded plastic material engageable by the photofinishing apparatus for driving the film unit during photofinishing;
   a photosensitive film disk mounted on said core and having an area extending circularly around said core for recording the images; and
   magnetic oxide particles dispersed within said molded material for recording data relating to the photofinishing of selected images in the photofinishing apparatus.

5. A photographic film unit for recording a plurality of images that are subsequently printed in a photographic printing apparatus having a data decoding means, said unit comprising:

a molded polystyrene core adapted to be engaged by the photographic printing apparatus for rotatably driving the film unit during printing;

a photosensitive film disk mounted on said core, said disk having an unexposed area extending circularly around said core for recording the images; and magnetic particles molded within the driven polystyrene core for recording coded data relating to printing of selected images in the photographic printing apparatus, said data being decoded during rotation of said core in the photographic printing apparatus.

6. A photographic film unit for receiving a plurality of exposures and adapted to be processed in photofinishing apparatus in accordance with data prerecorded on the film unit and read therefrom during rotary movement thereof, said film unit comprising:

a generally circular unitary hub member adapted to be rotatably positioned by the photofinishing apparatus;

a photographic film disk fixedly attached to said hub member and having an area for image exposures disposed about said hub member;

said hub member including interspersed magnetic oxide particles for prerecording data on said hub member that is read during rotation of said hub and used in photofinishing of the film unit in the photofinishing apparatus.

7. A photographic film unit adapted to be rotated in a camera for recording a plurality of images and rotatable in photofinishing apparatus for processing and printing such images, said film unit comprising:

a film disk having a central opening surrounded by a region for recording the images circularly around said opening;

a plastic circular core positioned in said opening and attached to said film disk, said core having surfaces adapted to be engaged by the camera for positioning the film disk in the camera during exposure and by the photofinishing apparatus for positioning said film disk in the photofinishing apparatus during processing and printing; and magnetic oxide particles uniformly dispersed through the plastic material of said core in a substantial portion of said core for recording data relating to the film unit.

* * * * *